United States Patent
Yoneyama

(10) Patent No.: US 11,673,262 B2
(45) Date of Patent: Jun. 13, 2023

(54) PRESS WORKING SIMULATOR

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 295 days.

(21) Appl. No.: 16/877,984

(22) Filed: May 19, 2020

(65) Prior Publication Data

US 2020/0406456 A1  Dec. 31, 2020

(30) Foreign Application Priority Data

Jun. 25, 2019  (JP) .............................. JP2019-116994

(51) Int. Cl.
*B25J 9/16* (2006.01)
*B25J 11/00* (2006.01)
*G05B 19/418* (2006.01)

(52) U.S. Cl.
CPC ............. *B25J 9/1605* (2013.01); *B25J 9/163* (2013.01); *B25J 9/1666* (2013.01); *B25J 11/005* (2013.01); *G05B 19/41885* (2013.01); *G05B 2219/32351* (2013.01); *G05B 2219/39105* (2013.01)

(58) Field of Classification Search
CPC ......... B21D 43/05; B25J 9/1605; B25J 9/163; B25J 9/1666; B25J 9/1671; G05B 19/41885; G05B 2219/32351; G05B 2219/40317
See application file for complete search history.

(56) References Cited

U.S. PATENT DOCUMENTS

| | | | | |
|---|---|---|---|---|
| 6,106,262 | A * | 8/2000 | Levin | B30B 11/14 425/193 |
| 2013/0104613 | A1* | 5/2013 | Kaneko | B30B 15/148 72/20.5 |
| 2014/0277737 | A1* | 9/2014 | Sekiyama | B25J 9/1671 700/259 |
| 2018/0290198 | A1* | 10/2018 | Suzuki | B30B 13/00 |
| 2020/0041979 | A1* | 2/2020 | Yamada | G06F 30/20 |
| 2020/0348657 | A1* | 11/2020 | Yamada | G05B 19/41885 |

FOREIGN PATENT DOCUMENTS

| | | |
|---|---|---|
| JP | 2005216112 A | 8/2005 |
| JP | 2021-003736 A | 1/2021 |

* cited by examiner

*Primary Examiner* — Jeff A Burke
*Assistant Examiner* — Zachary Joseph Wallace
(74) *Attorney, Agent, or Firm* — Studebaker & Brackett PC

(57) ABSTRACT

A press working simulator according to an aspect of the present disclosure includes: a robot program storage section that stores a robot program that instructs a robot how to move; a press program storage section that stores a press program that instructs a press machine how to move; a profile data setting section that causes the press program storage section to store a press program according to profile data that records what position a die is in at each time point when the press machine is actually moved; a model placing section that places three-dimensional models of a workpiece, the robot, and the press machine in a virtual space; a press movement processing section that causes the three-dimensional model of the press machine to move according to the press program; and a robot movement processing section that causes the three-dimensional model of the robot to move according to the robot program.

9 Claims, 6 Drawing Sheets

PRESS WORKING SIMULATOR

This application is based on and claims the benefit of priority from Japanese Patent Application No. 2019-116994, filed on Jun. 25, 2019, the content of which is incorporated herein by reference.

BACKGROUND OF THE INVENTION

Field of the Invention

The present invention relates to press working simulation.

Related Art

A known press working system includes a press machine that presses a workpiece while holding the workpiece between a pair of dies (movable and fixed dies); and a robot that supplies the workpiece to the press machine and takes out the pressed workpiece. To improve the productivity of such a press working system, it is desirable to cause the press machine and the robot to coordinately move so that the robot supplies and takes out the workpiece before the movable die in the press machine reaches the top dead center and after a certain space is formed between the movable and fixed dies.

As for the technique for causing a press machine and a robot to move coordinately, for example, Patent Document 1 discloses a method for controlling a transfer robot for reciprocating machines so that, when the transfer robot transfers a workpiece between adjacent ones of the reciprocating machines arranged in line, the transfer section of the transfer robot does not interfere with the movement sections of the reciprocating machines, the method including: sequentially detecting positions of the movement sections during working by the reciprocating machines; and controlling the movement of the transfer section of the transfer robot based on a data table that stores relationships between positions of the movement sections and positions of the transfer section where it does not interfere with the movement sections.

Patent Document 1: Japanese Unexamined Patent Application, Publication No. 2005-216112

SUMMARY OF THE INVENTION

In the technique of Patent Document 1, the data table stores relationships that have been previously calculated between phase angles or a main gear in the press machine and coordinate positions of a crossbar in the transfer robot where the crossbar is on the verge of interfering with the movable die. In such a press working system, however, any component other than the crossbar in the transfer robot or the workpiece held by the transfer robot may interfere with the press machine. Therefore, a need exists for a technique that makes it possible to check in detail whether or not a robot program is suitable for a press working system including a press machine and a robot which work cooperatively.

An aspect of the present disclosure is directed to a press working simulator that simulates and checks operation of a press working system including a robot, that transfers a workpiece and a press machine that works the workpiece while holding the workpiece between dies, the press working simulator including: a robot program storage section that stores a robot program that instructs the robot how to move; a press program storage section that stores a press program that instructs the press machine how to move; a profile data setting section that causes the press program storage section to store the press program according to profile data that records what position the die is in at each time point when the press machine is actually moved; a model placing section that places three-dimensional models of the workpiece, the robot, and the press machine in a virtual space; a press movement processing section that causes the three-dimensional model of the press machine to move according to the press program; and a robot movement processing section that causes the three-dimensional model of the robot, to move according to the robot program.

The press working simulator according to the present disclosure makes it possible to check in detail whether or not a robot program is suitable for a press working system including a press machine and a robot which work cooperatively.

DETAILED DESCRIPTION OF THE INVENTION

Figure 1:
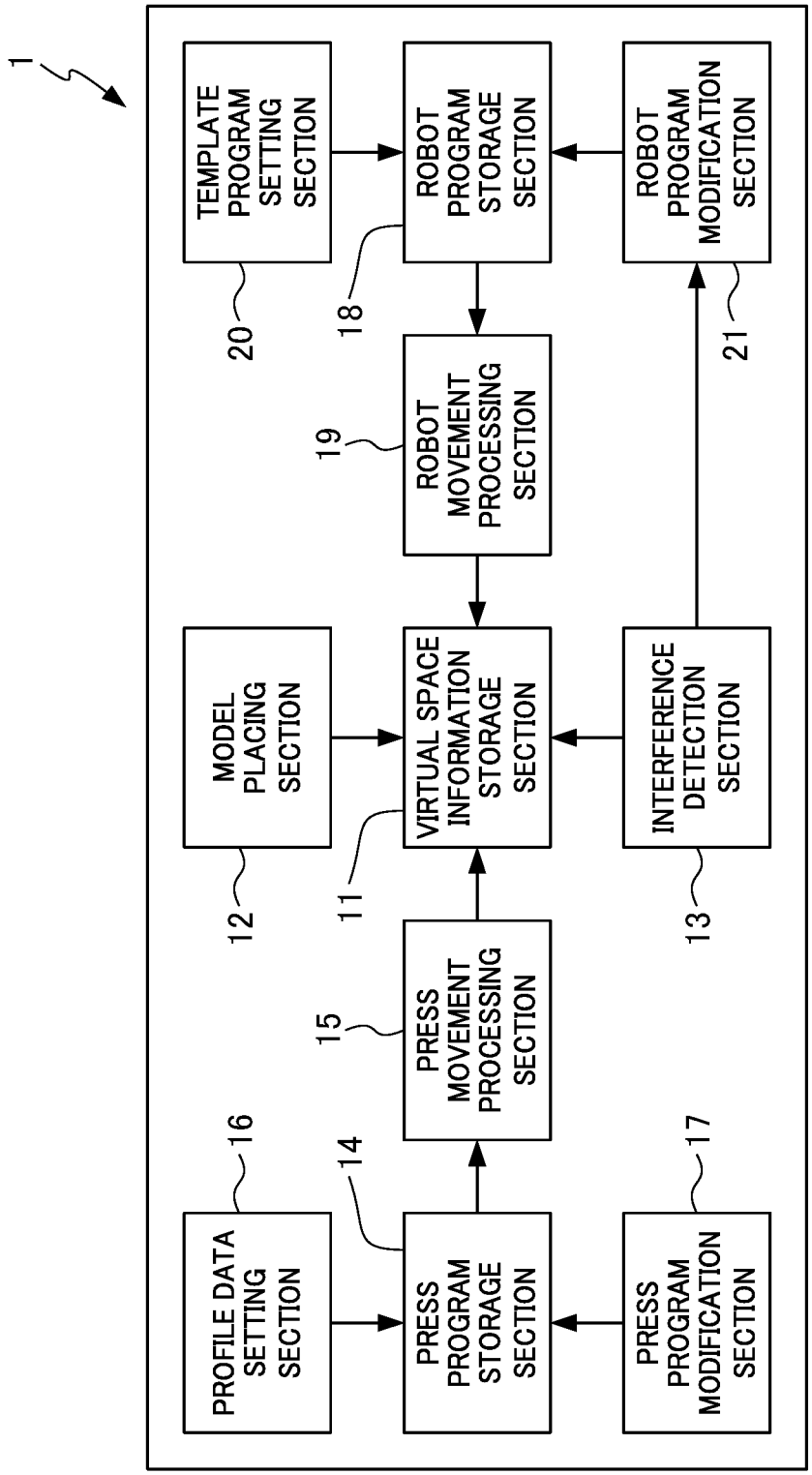
FIG. 1 is a schematic diagram showing a configuration of a press working simulator according to an embodiment of the present disclosure.

Hereinafter, embodiments of the present disclosure will be described with reference to the drawings. FIG. 1 is a schematic diagram showing a configuration of a press working simulator 1 according to an embodiment of the present disclosure. The press working simulator 1 may be implemented by causing a computer including, for example, a CPU, a memory, and other components to execute an appropriate program.

The press working simulator 1 includes a virtual space information storage section 11, a model placing section 12, an interference detection section 13, a press program storage section 14, a press movement processing section 15, a profile data setting section 16, a press program modification section 17, a robot program storage section 18, a robot movement processing section 19, a template program setting section 20, and a robot program modification section 21. These components are distinguishable in terms of function and do not need to be clearly distinguishable according to program structure.

The press working simulator 1 is a system that reproduces operation of a press working system in a virtual space to simulate and check the operation, in other words, a system that simulates operation of a press working system. The pressing working simulator may reproduce operation of a press working system including: one or more press machines that work a workpiece while holing it between dies (movable and fixed dies); and a robot that holds and transfers a workpiece, supplies the workpiece to the press machine, and takes out the workpiece from the press machine. The press working system may be an apparatus including plural press machines and a robot and configured to shape a single workpiece step by step with the press machines and to cause the robot to transfer the workpiece from an upstream one to a downstream one of the press machines. The press working simulator 1 may be a robot programming system that creates, based on a result of simulation, a robot program that enables a robot to move properly in a press working system.

The virtual space information storage section 11 stores information about three-dimensional models placed in a virtual space. Specifically, the virtual space information storage section 11 stores information about three-dimensional models of a workpiece, a press machine, and a robot, which are placed by the model placing section 12 described below.

Figure 2:
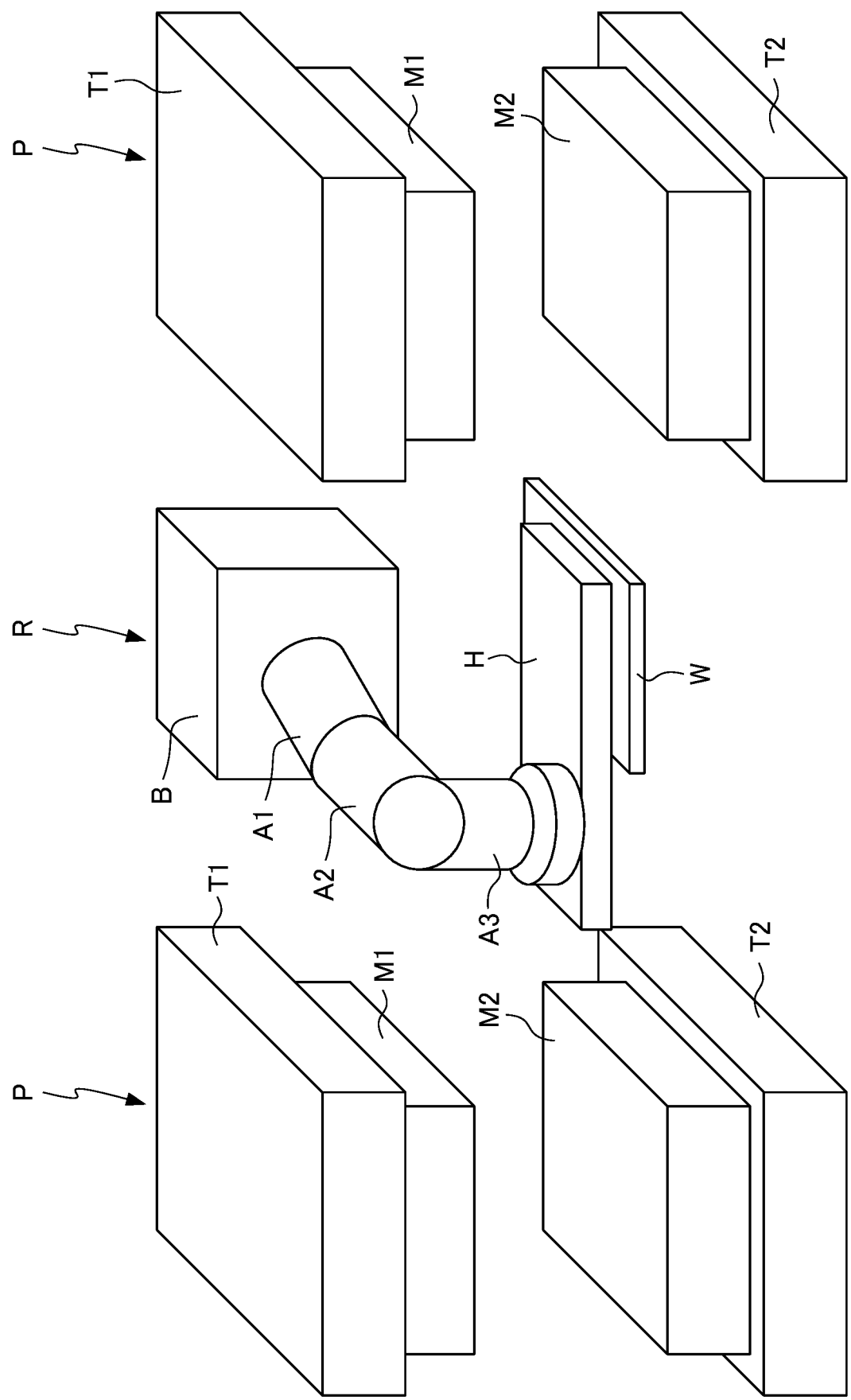
FIG. 2 is a schematic diagram showing three-dimensional models placed by a model placing section in the press working simulator of FIG. 1.

As illustrated in FIG. 2, the model placing section 12 places a three-dimensional model of a workpiece W, three-dimensional models of press machines P, and a three-dimensional model of a robot R in a virtual space, in other words, causes the virtual space information storage section 11 to store information about the three-dimensional models. Therefore, the model placing section 12 stores information necessary for making three-dimensional models including the geometries and axial arrangements of the workpiece W, the press machines P, and the robot R.

These three-dimensional models may be made by modeling only components that potentially interfere with one another in the actual press working system and are necessary for the calculation of the operation of the system. As shown in FIG. 2, a specific example or the three-dimensional model of the press machine P may include only dies (a movable die M1 and a fixed die M2) and tables (a movable table T1 and a fixed table T2 that support the dies M1 and M2. The three-dimensional model of the robot R may include a base B, plural arms A1, A2, and A3, and a work W-holding hand H, which are connected together.

The interference detection section 13 detects interference between the three-dimensional models of the workpiece W, the press machines P, and the robot R, in other words, determines whether or not the robot R can move properly. Specifically, the interference detection section 13 may be configured to determine any coordinates in an overlap zone between two or more three-dimensional models and to determine three-dimensional models containing such coordinates.

The press program storage section 14 stores a press program that instructs the press machines P how to move.

The press movement processing section 15 causes the press machines P to move, specifically, causes components of the press machines P, such as the movable dies M1 and the movable tables T1, to move in the virtual space according to the press program stored in the press program storage section 14.

The profile data setting section 16 causes the press program storage section 14 to store a press program according to profile data that records what positions the movable dies are in at each time point when the real press machines are actually moved. Specifically, the profile data setting section 16 stores profile data about the real press machines and initializes the press program, which is to be stored in the press program storage section 14, in such a way that the press program instructs how to move in agreement with the profile data about the actual press machines.

Figure 3:
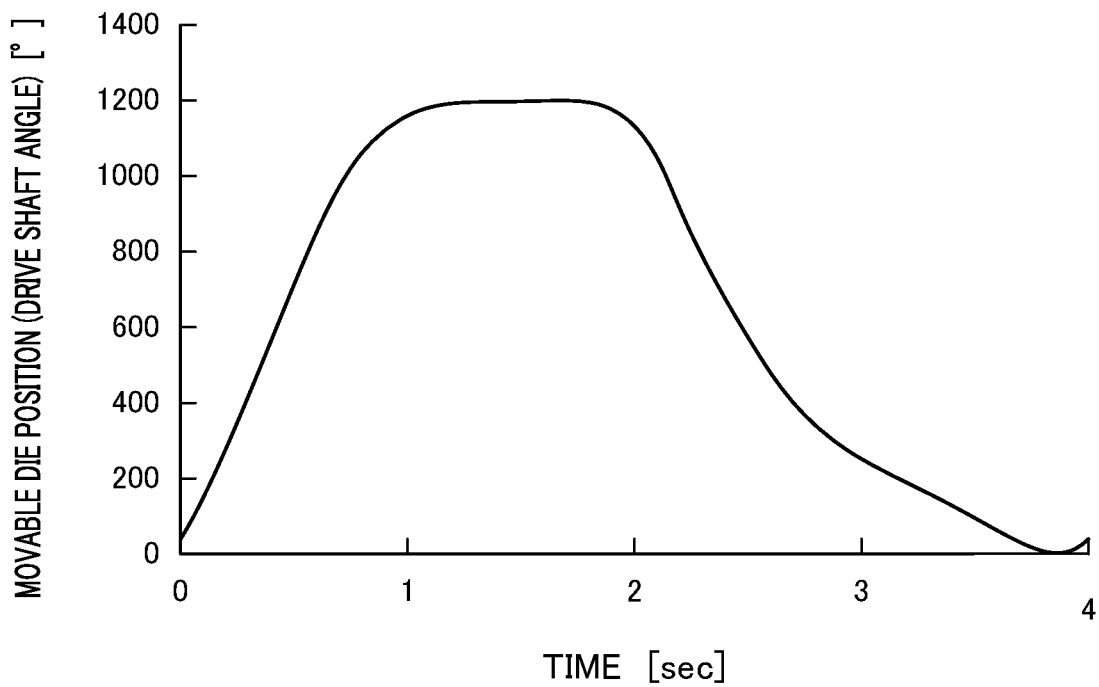
FIG. 3 is a graph showing an example of profile data stored by a profile data setting section in the press working simulator of FIG. 1.

FIG. 3 shows an example of profile data stored by the profile data setting section 16. In the example shown, the position of the movable die is represented by the angle by which a drive shaft rotates to drive the movable die, with the origin defined as the bottom dead center at which the movable die comes into contact with the fixed die during pressing.

The press program modification section 17 modifies the press program stored in the press program storage section 14 according to any difference between the press machine movement conditions to be checked and the press machine movement conditions under which the profile data is recorded while the real press machines are moved.

Figure 4:
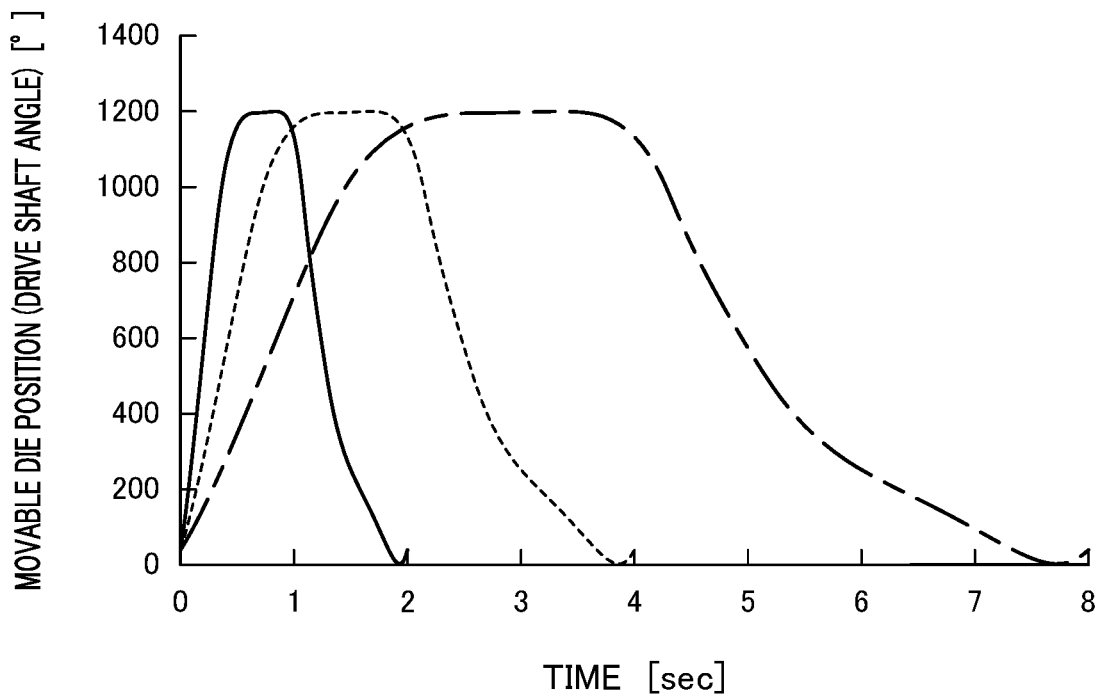
FIG. 4 a graph showing modified examples of a press program, which are created by a press program modification section in the press working simulator of FIG. 1.

If the press working cycle for the press machines to be checked is different from that during the recording of the profile data, the press program modification section 17 may modify, as illustrated in FIG. 4, the press program in the press program storage section 14 into a press program according to a profile formed by expanding or compressing the profile data in the time axis direction. FIG. 4 shows an example (solid line) in which the press working cycle is reduced to ½ by expanding the profile data (indicated by the broken line) by two times in the time axis direction, and an example (alternate long and short dash line) in which the press working cycle is increased to two times by compressing the profile data into ½ in the time axis direction.

Figure 5:
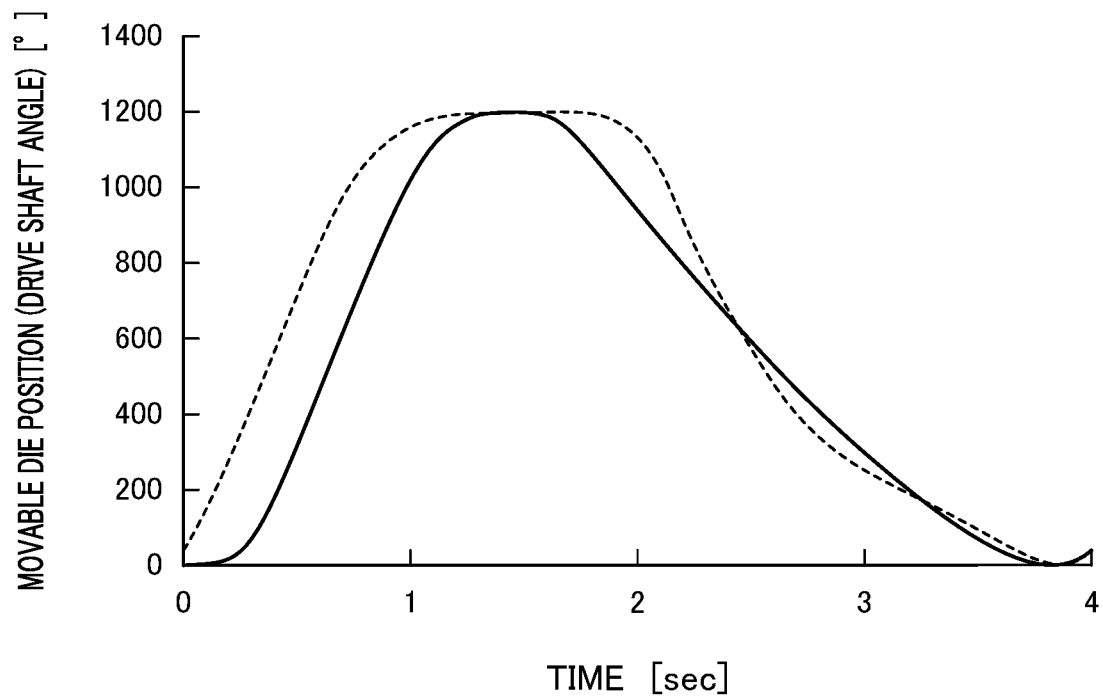
FIG. 5 is a graph showing a modified example of a press program, other than those in FIG. 4, which is created by the press program modification section in the press working simulator of FIG. 1.

Alternatively, the press program modification section 17 may be configured to modify, for example, the length of time during which the movable die is at the top dead center and the moving speed of the movable die, as shown in FIG. 5. FIG. 5 illustrates an example in which the rise in the graph is shifted parallel to the right to delay the timing at which the movable die moves from the bottom dead center toward the top dead center so that the graph is deformed to have a more linear rise, which results in a shorter period of time during which the movable die is at the top dead center. To make such a modification, the press program modification section 17 may be configured to display a profile data graph on a screen and allow the user to alter the graph by using a mouse or other device so that the press program is modified.

The robot program storage section 18 stores a robot program that instructs the robot how to move. The robot program is written according to a protocol similar to that used for programming real robots. Specifically, the robot program may specify target positions (teaching points) at which reference points such as a hand should be located and time points at which the reference points should be located at the target positions.

According to the robot program stored in the robot program storage section 18, the robot movement processing section 19 moves the robot R, specifically, each of components B, A1, A2, A3, and H of the robot R and the workpiece W held by the robot R, in the virtual space.

The template program setting section 20 causes the robot program storage section 18 to store, as an initial version of the robot program, a template program that instructs the robot R how to move basically. For this purpose, the template program setting section 20 stores a preset template program.

Figure 6:
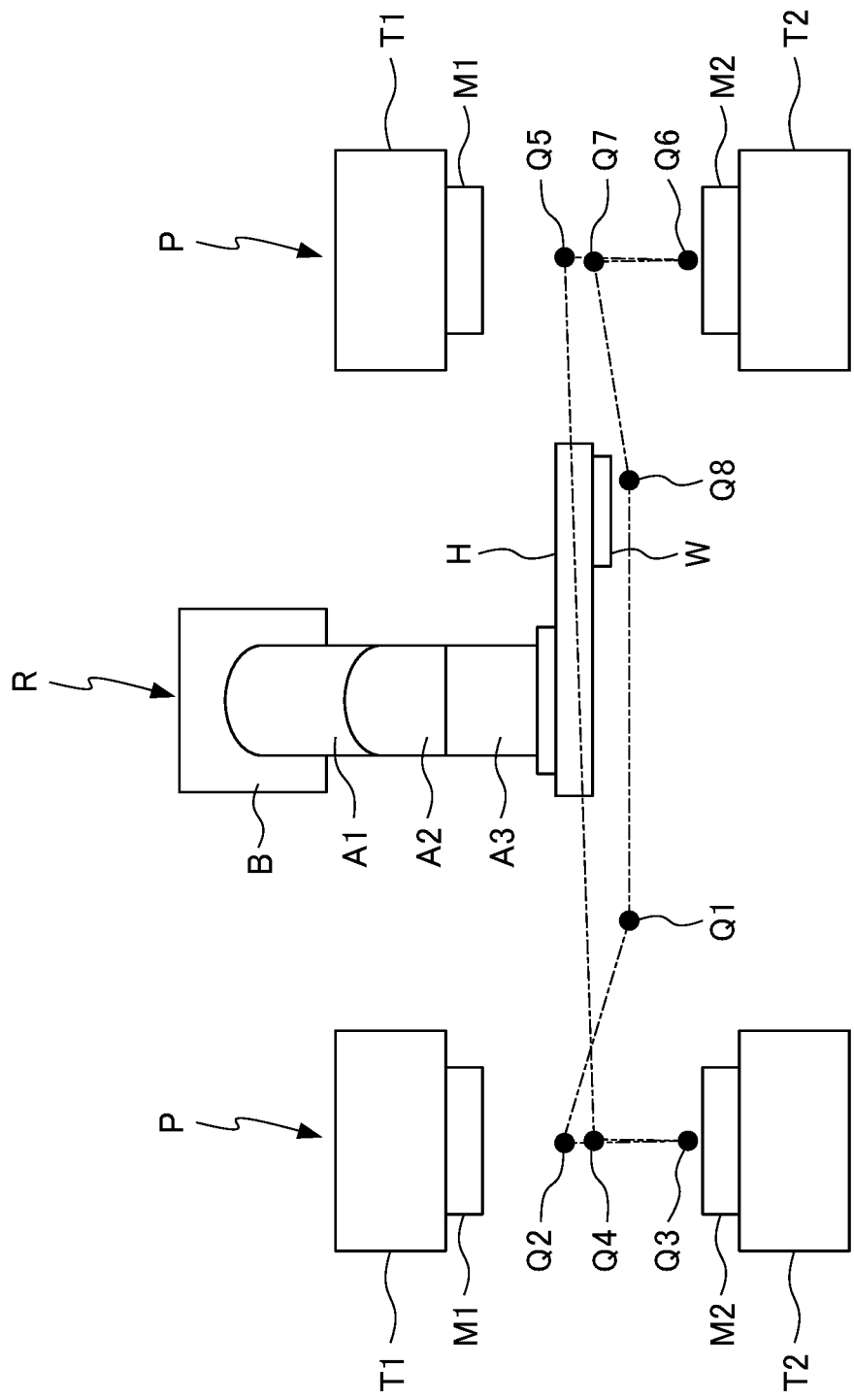
FIG. 6 is a schematic diagram showing examples of target positions according to a robot program stored by a robot program storage section in the press working simulator of FIG. 1.

FIG. 6 schematically shows an example of the template program stored by the template program setting section 20. This template program is a robot program that causes the robot R to move so as to take out the workpiece W from a fixed die M2 in an upstream press machine P and place the workpiece W on a fixed die M2 in a downstream press machine P, in which eight target positions Q1 to Q8 are provided at which reference points for a hand H are to be located.

According to the template program of FIG. 6, the hand H of the robot B uses a first target position Q1 as a starting point and moves to a second target position Q2 above the fixed die M2 in the upstream press machine P. At a third target position Q3, the hand H comes into contact with the workpiece W and holds the workpiece W and then moves to a fourth target position Q4 to take out the workpiece W from the fixed die M2. The hand H then moves to a fifth target position Q5 to place the workpiece W above the fixed die M2 in the downstream press machine P. The hand H then moves to a sixth target position Q6 to place the workpiece W on the fixed die M2. After the hand H releases the workpiece at the sixth target position Q6, the hand H moves to a target position Q7 to go away from the fixed die M2 and the workpiece W. The hand H then moves to a target position QS so that the robot R goes away from an area where the movable die M1 and the movable table T1 are to move.

The robot program modification section 21 modifies the robot program to prevent interference between the robot R and the press machines P, which has been detected by the interference detection section 13 when the press movement processing section 15 causes the press machines P to move according to the press program and the robot movement processing section 19 causes the robot R to move according to the robot program. The detection of the interference by the interference detection section 13 and the modification of the robot program by the robot program modification section 21 may be made per unit movement, which corresponds to the movement of the robot R and the press machine P performed during a travel from a target position Qn (n is the target position number) to a next target position Qn+1 according to the robot program.

If it is detected that the robot R or the workpiece W interferes with the press machine P during the travel from the target position Pn to the target position Qn+1, the robot program modification section 21 modifies the robot program to change the coordinates of the target position Qn+1. If the coordinates of the target position Qn+1 are changed, the press working simulator 1 may cause the press movement processing section 15 and the robot movement processing section 19 to make movement again from the target position Qn to the changed target position Qn+1 and cause the interference detection section 13 to check whether or not interference occurs between the robot R or the workpiece U and the press machine P. In other words, the press working simulator 1 may modify the robot program at each target position so as to prevent interference between the robot R or the workpiece U and the press machine P.

When the interference detection section 13 detects interference, the robot program modification section 21 preferably shifts the target position Qn+1 in a direction in which the movable die M1 moves, more specifically, in a direction in which the movable die M1 approaches the fixed die M2. If the target position Qn+1 is shifted in the direction in which the movable die M1 moves, the direction in which the workpiece W is placed onto the fixed die M2 and the direction in which the workpiece U is taken out from the fixed die M2 can remain unchanged.

Usually, the direction in which the movable die M1 moves is the same as the direction in which the workpiece U is placed onto the fixed die M2 and the direction in which the workpiece U is taken out from the fixed die M2. Therefore, the robot program modification section 21 can shift the target position Qn+1 toward the previous target position Qn or the next target position Qn+2. The amount of shift of the target position Qn+1 may be a constant distance or a constant proportion of the distance between the target position Qn+1 and the previous target position Qn or the next target position Qn+2.

The amount of shift of the target position Qn+1 to prevent the interference between the robot R or the workpiece W and the press machine P should be determined within a range where the workpiece W does not interfere with the fixed die M2. Therefore, the amount of shift may have a lower limit set to the distance between the shifted target position Qn+1 and the previous target position Qn or the next target position Qn+2. If such a lower limit is not enough for the shift of the target position Qn+1 to prevent the interference between the robot R or the workpiece W and the press machine P, the previous target position Qn or the next target position Qn+2, whose relationship with the target position Qn is not in the direction of movement of the die, may be shifted in a direction in which the movable die M1 goes away from the fixed die M2. This makes it possible to prevent the hand H from overshooting toward the movable die M1 during the passage through the target position Qn while preventing the interference between the robot R or the workpiece W and the press machine P.

In a specific example, if interference is detected during the movement from the first target position Q1 to the second target position Q2 according to the template program of FIG. 6, the robot program modification section 21 may shift the second target position Q2 in a direction toward the fixed die M2, that is, toward the third target position Q3. This makes it possible to prevent interference during the movement from the first target position. Q1 to the second target position Q2.

If interference is detected during the movement from the third target position Q3 to the fourth target positon Q4 according to the template program of FIG. 6, the robot program modification section 21 may shift the fourth target position Q4 in a direction toward the fixed die M2, that is, toward the third target position Q3. Similarly, if interference is detected during the movement from the fourth target position Q4 to the fifth target position Q5, the robot program modification section 21 may shift the fifth target position Q5 toward the sixth target position Q6, and if interference is detected during the movement from the sixth target position Q6 to the seventh target position Q7, the robot program modification section 21 may shift the seventh target position Q7 toward the sixth target position Q6.

The robot program modification section 21 may further adjust the movement speed or acceleration of the robot R in the robot program. When the movement speed or acceleration of the robot R is increased, the time taken for the robot R to move can be shortened. This allows the robot R to transfer the workpiece during a period of time when the distance between the movable die M1 and the fixed die M2 is relatively large in the press machine P, so that the interference between the robot R or the workpiece W and the press machine P can be prevented under various conditions.

Figure 7:
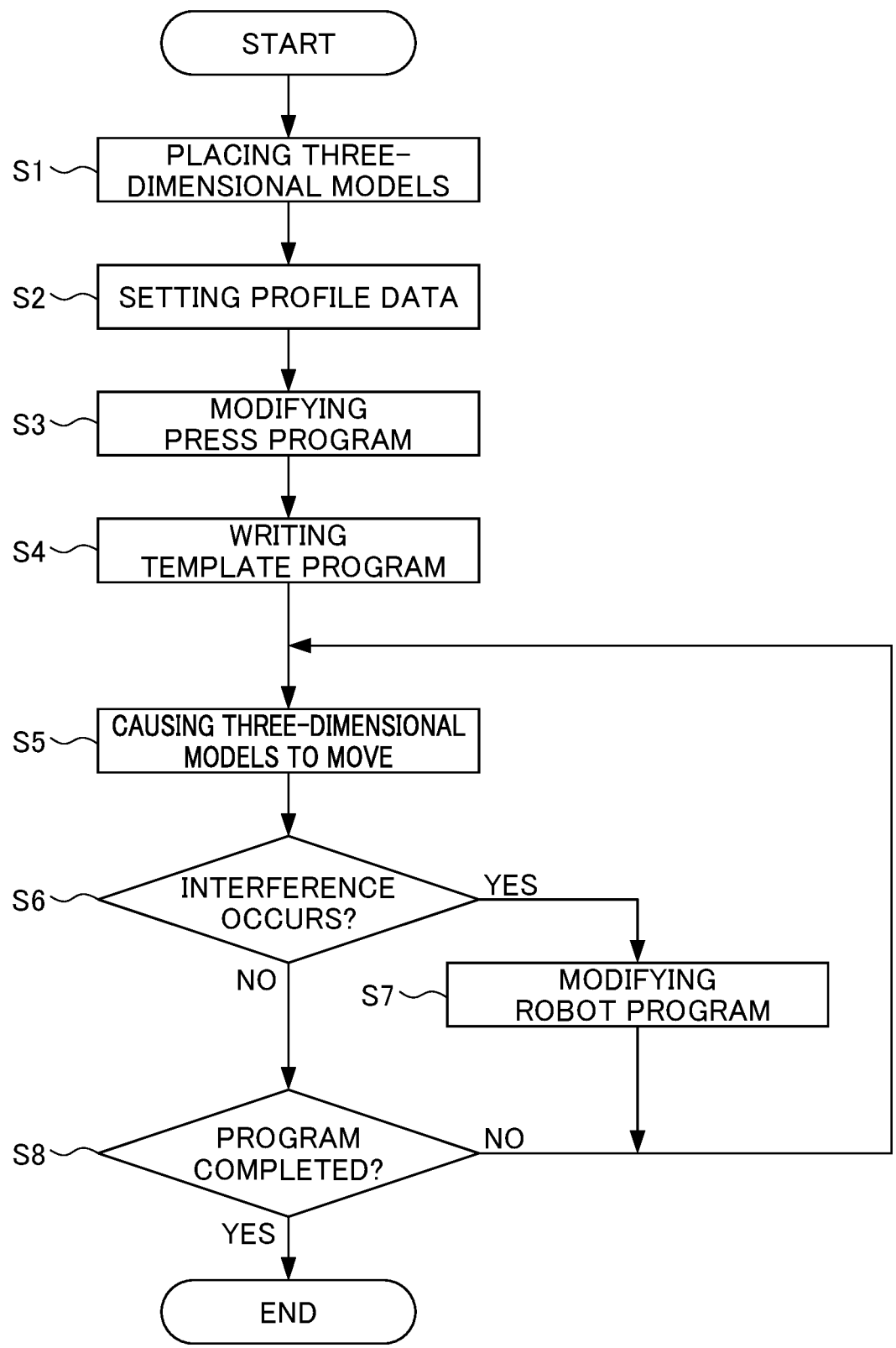
FIG. 7 is a flowchart showing a procedure of simulation by the press working simulator of FIG. 1.

Next, FIG. 7 shows a procedure in which the press working simulator 1 modifies the robot program. The modification of the robot program includes placing three-dimensional models (step S1); setting profile data (step S2); modifying a press program (step S3); writing a template program (step S4); moving three-dimensional models (step S5); checking whether interference occurs (step S6); modifying a robot program (step S7); and determining whether to end the program (step S8).

The step S1 of placing three-dimensional models may include causing the model placing section 12 to place three-dimensional models of the robot R, the press machines P, and the workpiece W in a virtual space, which is virtually created by the virtual space information storage section 11.

The step S2 of setting profile data may include causing the profile data setting section 16 to instruct the press program storage section 14 to store a press program based on profile data.

The step S3 of modifying the press program may include modifying the press program, which is stored in the press program storage section 14, according to the requirements for press working to be checked.

The step S4 of writing a template program may include causing the template program setting section 20 to write and store a template program as an initial version of a robot program into the robot, program storage section 18.

The step S5 of moving three-dimensional models may include causing the press movement processing section 15 to move a three-dimensional model of the press machine P according to the press program stored in the press program storage section 14 and causing the robot movement processing section 19 to move three-dimensional models of the robot R and the workpiece W according to the robot program stored in the robot program storage section 18.

The step S6 of checking whether interference occurs may include causing the interference detection section 13 to check whether or not interference occurs between the three-dimensional model of the press machine P and the three-dimensional model of the robot R or the three-dimensional model of the workpiece W. If the interference detection section 13 detects interference, the process proceeds to step S7, and if the interference detection section 13 does not detect interference, the process proceeds to step S8.

The step S7 of modifying the robot program may include causing the robot program modification section 21 to modify the robot program, which is stored in the robot program storage section 18, so that the interference between the three-dimensional model of the press machine P and the three-dimensional model of the robot R or the three-dimensional model of the workpiece W is prevented. If the robot program is modified in step S7, the process returns to step S5 in which the three-dimensional models are moved according to the robot program.

The step S8 of checking whether to end the program may include checking whether or not the press program and the robot program are executed to completion. If the press program and the robot program are executed to completion, the process is ended. If part of at least one of the press program and the robot program remains unexecuted, the process returns to step S15 in which the three-dimensional models are moved according to the remaining part of the program.

The press working simulator 1 includes the profile data setting section 16 which causes the press program storage section 14 to store a press program according to profile data that records what position the die M1 or M2 is in at each time point when the real press machine P is actually moved. Therefore, the three-dimensional model of the press machine P can be moved to approximate the movement of the real press machine P. Therefore, the press working simulator 1 can accurately check in detail whether or not the robot program is suitable.

In addition, the press working simulator 1, which includes the interference detection section 13 and the robot program modification section 21, can function as a robot programming system to automatically create an appropriate robot program.

Furthermore, the press working simulator 1 includes the template program setting section 20 that causes the robot program storage section 18 to store, as an initial version of the robot program, a template program that instructs the robot R how to move basically, which makes it possible to easily and reliably create an appropriate robot program.

While embodiments of the press working simulator according to the present disclosure have been described above, it will be understood that the embodiments are not intended to limit the press working simulator according to the present disclosure. It will also be understood that the advantageous effects shown in the above embodiments are mere examples of the most preferred effect produced by the press working simulator according to the present disclosure and are not intended to limit the advantageous effects of the press working simulator according to the present disclosure.

The press working simulator according to the present disclosure may have any configuration for the robot program and may have any configuration to detect interference. The press working simulator according to the present disclosure may be configured to display the movement of three-dimensional models on a screen, allow the user to observe interference on the screen, and allow the user to determine how the robot program should be modified to prevent interference.

The press working simulator according to the present disclosure may place any number of three-dimensional models of press machines and robots in the virtual space. For example, the press working simulator according to the present disclosure may be configured to move, in a virtual space, a three-dimensional model of a robot that supplies a workpiece to a single press machine and takes out the workpiece from the press machine. In the press working simulator according to the present disclosure, all press machines and robots placed in the virtual space may move coordinately on a single time axis.

EXPLANATION OF REFERENCE NUMERALS

1: Press working simulator
11: Virtual space information storage section
12: Model placing section
13: Interference detection section
14: Press program storage section
15: Press movement processing section
16: Profile data setting section
17: Press program modification section
18: Robot program storage section
19: Robot movement processing section
20: Template program setting section
21: Robot program modification section

What is claimed is:
1. A press working simulator that simulates and checks operation of a press working system comprising a robot that transfers a workpiece and a press machine that works the workpiece while holding the workpiece between dies, the press working simulator comprising:
   a robot program storage section that stores a robot program that instructs the robot how to move;
   a press program storage section that stores a press program that instructs the press machine how to move;
   a profile data setting section that causes the press program storage section to store the press program according to profile data that dynamically records what position the dies are in from the press machine at each time point as the press machine is actually moved;

a model placing section that places three-dimensional models of the workpiece, the robot, and the press machine in a virtual space;

a press movement processing section that causes the three-dimensional model of the press machine to move according to the press program; and a robot movement processing section that causes the three-dimensional model of the robot to move according to the robot program.

2. The press working simulator according to claim 1, further comprising a press program modification section that modifies the press program according to any difference between press machine movement conditions to be checked and press machine movement conditions under which the profile data is recorded.

3. The press working simulator according to claim 1, further comprising:

an interference detection section that detects interference between the three-dimensional models of the workpiece, the robot, and the press machine; and a robot program modification section that modifies the robot program to prevent interference detected by the interference detection section.

4. The press working simulator according to claim 3, the robot program modification section changing coordinates of a target position $Q_{n+1}$ of the robot if the interference detection section detects interference during travel of the three-dimensional model of the robot from a target position $Q_n$ of the robot to the target position $Q_{n+1}$.

5. The press working simulator according to claim 4, the robot program modification section changing the coordinates of the target position $Q_{n+1}$ by shifting the target position $Q_{n+1}$ in a direction in which a movable one of the dies moves.

6. The press working simulator according to claim 5, the robot program modification section changing the coordinates of the target position $Q_{n+1}$ by shifting the target position $Q_{n+1}$ in a direction in which the movable one of the dies moves toward another one of the dies.

7. The press working simulator according to claim 5, the robot program modification section changing the coordinates of the target position $Q_{n+1}$ by shifting the target position $Q_{n+1}$ in a direction in which the workpiece is placed onto one of the dies.

8. The press working simulator according to claim 4, the robot program modification section changing the coordinates of the target position $Q_{n+1}$ by shifting the target position $Q_{n+1}$ in a direction toward the target position $Q_n$.

9. The press working simulator according to claim 4, the robot program modification section changing the coordinates of the target position $Q_{n+1}$ by shifting the target position $Q_{n+1}$ in a direction toward a next target position $Q_{n+2}$ of the robot.

* * * * *